United States Patent
Kimura et al.

(10) Patent No.: US 10,572,318 B2
(45) Date of Patent: Feb. 25, 2020

(54) LOG ANALYSIS APPARATUS, LOG ANALYSIS SYSTEM, LOG ANALYSIS METHOD AND COMPUTER PROGRAM

(71) Applicant: NIPPON TELEGRAPH AND TELEPHONE CORPORATION, Chiyoda-ku (JP)

(72) Inventors: Tatsuaki Kimura, Musashino (JP); Akio Watanabe, Musashino (JP); Tsuyoshi Toyono, Musashino (JP); Ken Nishimatsu, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 305 days.

(21) Appl. No.: 15/502,936

(22) PCT Filed: Aug. 20, 2015

(86) PCT No.: PCT/JP2015/073424
§ 371 (c)(1),
(2) Date: Feb. 9, 2017

(87) PCT Pub. No.: WO2016/031681
PCT Pub. Date: Mar. 3, 2016

(65) Prior Publication Data
US 2017/0228265 A1    Aug. 10, 2017

(30) Foreign Application Priority Data
Aug. 25, 2014 (JP) .................. 2014-170097

(51) Int. Cl.
*G06F 9/54*   (2006.01)
*G06F 11/30*  (2006.01)
(Continued)

(52) U.S. Cl.
CPC .......... *G06F 9/542* (2013.01); *G06F 11/3024* (2013.01); *G06F 11/34* (2013.01); *G06F 11/3409* (2013.01); *G06F 17/40* (2013.01)

(58) Field of Classification Search
None
See application file for complete search history.

(56) References Cited

U.S. PATENT DOCUMENTS

| | | |
|---|---|---|
| 2011/0185234 A1 | 7/2011 | Cohen et al. |
| 2014/0007137 A1 | 1/2014 | Sato et al. |
| 2016/0019206 A1* | 1/2016 | Mysur .................. G06Q 10/06 707/825 |

FOREIGN PATENT DOCUMENTS

| | | |
|---|---|---|
| JP | 2013-168226 A | 8/2013 |
| JP | 2014-10666 A | 1/2014 |
| JP | 2015-36891 A | 2/2015 |

OTHER PUBLICATIONS

Bayardo Jr., "Efficiently Mining Long Patterns from Databases"; 1998; Proceedings of the 1998 ACM SIGMOD international conference on Management of data—SIGMOD '98; pp. 85-93. (Year: 1998).*

(Continued)

*Primary Examiner* — Umut Onat
(74) *Attorney, Agent, or Firm* — Oblon, McClelland, Maier & Neustadt, L.L.P.

(57) ABSTRACT

Techniques for extracting a set of highly correlated logs without user's prior knowledge of generation rules of logs generated by a machine. A log analysis apparatus includes: a template storage unit configured to store templates for log messages; a template determination unit configured to determine templates corresponding to log messages provided from a to-be-monitored host from the stored templates; an event candidate extraction unit configured to detect templates determined for log messages provided from the same (Continued)

host from the determined templates and extract a sequence of the detected templates as an event candidate; and an event extraction unit configured to extract a sequence of frequently occurring templates as an event from the extracted event candidate.

10 Claims, 11 Drawing Sheets

(51) Int. Cl.
     *G06F 11/34*     (2006.01)
     *G06F 17/40*     (2006.01)

(56) References Cited

OTHER PUBLICATIONS

International Search Report dated Oct. 27, 2015 in PCT/JP2015/073424 filed Aug. 20, 2015.
Splunk http://www.splunk.com/, 2014, (2 pages).
Qiu, T. et al., "What Happened in my Network? Mining Network Events from Router Syslogs", In IMC, pp. 472-484, 2010.
Chi, Y. et al., "Moment: Maintaining Closed Frequent Itemsets over a Stream Sliding Window", In Proc. of ICDM, ( 8 pages), 2004.
Jiang, N. et al., "CFI-Stream: Mining Closed Frequent Itemsets in Data Streams", In Proc. of KDD, pp. 592-597, 2006.

\* cited by examiner

FIG.1

| MESSAGE | TEMPLATE |
|---|---|
| security telnet connection 662288 with broken | security telnet connection * with broken |
| L2TP Tunnel Up Failure self_tunnel_ID=77742 dest_tunnel_ID=88888 | L2TP Tunnel Up Failure self_tunnel_ID=* dest_tunnel_ID=* |
| host_name > show port grep -v unused | * > show port grep -v unused |

LOG ANALYSIS APPARATUS, LOG ANALYSIS SYSTEM, LOG ANALYSIS METHOD AND COMPUTER PROGRAM

TECHNICAL FIELD

The present invention relates to techniques for extracting information useful for users from log information supplied from various machines and particularly relates to techniques suitable for sequential extraction of necessary information without user's direct prior knowledge of generation rules in a form of logs generated by the machines.

BACKGROUND ART

Today, machines and software items having different roles and manufactured by different manufacturers are monitored and managed in an integrated manner for primary purpose of cost reduction. Meanwhile, these various machine and software items have mechanisms to output logs having their specific forms, which are used to monitor and manage the machines. In connection with development of information devices, the log information becomes complicated and large scaled, and efficient monitoring methods are required.

In this situation, an analysis platform for simplifying log analysis is proposed in non-patent document 1. In order to use it, however, prior knowledge regarding meaning of occurrence of individual logs and/or contents of log messages is needed, and its operation is difficult if know-how on analysis of a vast amount of unknown logs is not accumulated.

Meanwhile, a template comprehension method for cases where syslog generated by network devices such as a router are targeted and some formats such as vendors, message types, error codes and detailed message contents are provided in advance is provided in non-patent document 2. A scheme for displaying digest information for the syslog with use of positional relationship of routers or the like is proposed.

According to these prior techniques, some prior knowledge is needed at least at a stage of collecting information. For example, it is necessary to comprehend from which vendor the logs are collected and/or which portions in messages are indicative of error codes, and a template comprehension mechanism is not only simply prepared but also manual input and preparation are needed in advance. Also, since the digest display function for the syslog is specific to the syslog, it is difficult to apply it to other monitored log information.

PRIOR ART DOCUMENTS

Non-Patent Documents

Non-patent document 1: Splunk http://www.splunk.com/

Non-patent document 2: T. Qiu, Z. Ge, D. Pei, J. Wang, J, Xu, "What Happened in my Network? Mining Network Events from Router Syslogs", In IMC, 2010.

Non-patent document 3: Y. Chi, H. Wang, P. S. Yu, and R. R. Muntz, "Moment: Maintaining Closed Frequent Itemsets over a Stream Sliding Window", In Proc. of ICDM, 2004.

Non-patent document 4: N. Jiang, and L. Gruenwald, "CFI-Stream: Mining Closed Frequent Itemsets in Data Streams", In Proc. of KDD, 2006.

SUMMARY OF INVENTION

Problem to be Solved by the Invention

In Patent Application Number 2013-168226 filed by this applicant, a method for sequentially extracting generic log templates, which are limited to the syslog, without use of the prior information is disclosed. Meanwhile, templates extracted with the method are specified by unit of one row as illustrated in FIG. 1, and log analyses on association of combinations of templates extracted from sequentially occurring logs in a network are desirable.

Accordingly, an object of the present invention is to provide techniques for extracting a set of highly correlated logs without user's prior knowledge of generation rules of logs generated with machines.

Means for Solving the Problem

In order to achieve the above object, one aspect of the present invention relates to a log analysis apparatus comprising: a template storage unit configured to store templates for log messages; a template determination unit configured to determine templates corresponding to log messages provided from a to-be-monitored host from the stored templates; an event candidate extraction unit configured to detect templates determined for log messages provided from the same host from the determined templates and extract a sequence of the detected templates as an event candidate; and an event extraction unit configured to extract a sequence of frequently occurring templates as an event from the extracted event candidate.

Advantage of the Invention

According to the present invention, a set of highly correlated logs can be extracted without user's prior knowledge of generation rules of logs generated with machines.

BRIEF DESCRIPTION OF DRAWINGS

FIG. 1 is a diagram for illustrating an exemplary template for syslog;

EMBODIMENTS OF THE INVENTION

Embodiments of the present invention are described below with reference to the drawings.

In embodiments described below, a log analysis apparatus for performing log analyses in consideration of correlation among log messages is disclosed. Summarizing the present invention, the log analysis apparatus collects log messages from network devices and identifies templates corresponding to the collected log messages from templates for log messages as obtained beforehand. The log analysis apparatus detects the template for log messages provided from the same host, determines correlation among the templates based on an occurrence time difference between the detected template and a template detected for the host before and extracts a sequence of the detected templates depending on the determination as an event candidate. The log analysis apparatus further extracts a sequence of frequently occurring templates from the extracted event candidates as an event and provides users with it as a log analysis result.

In this manner, it is possible to extract not only a log message matching with a single template but also the correlated template sequence as an event based on temporal correlation among the multiple templates corresponding to the sequentially generated log messages.

Figure 2:
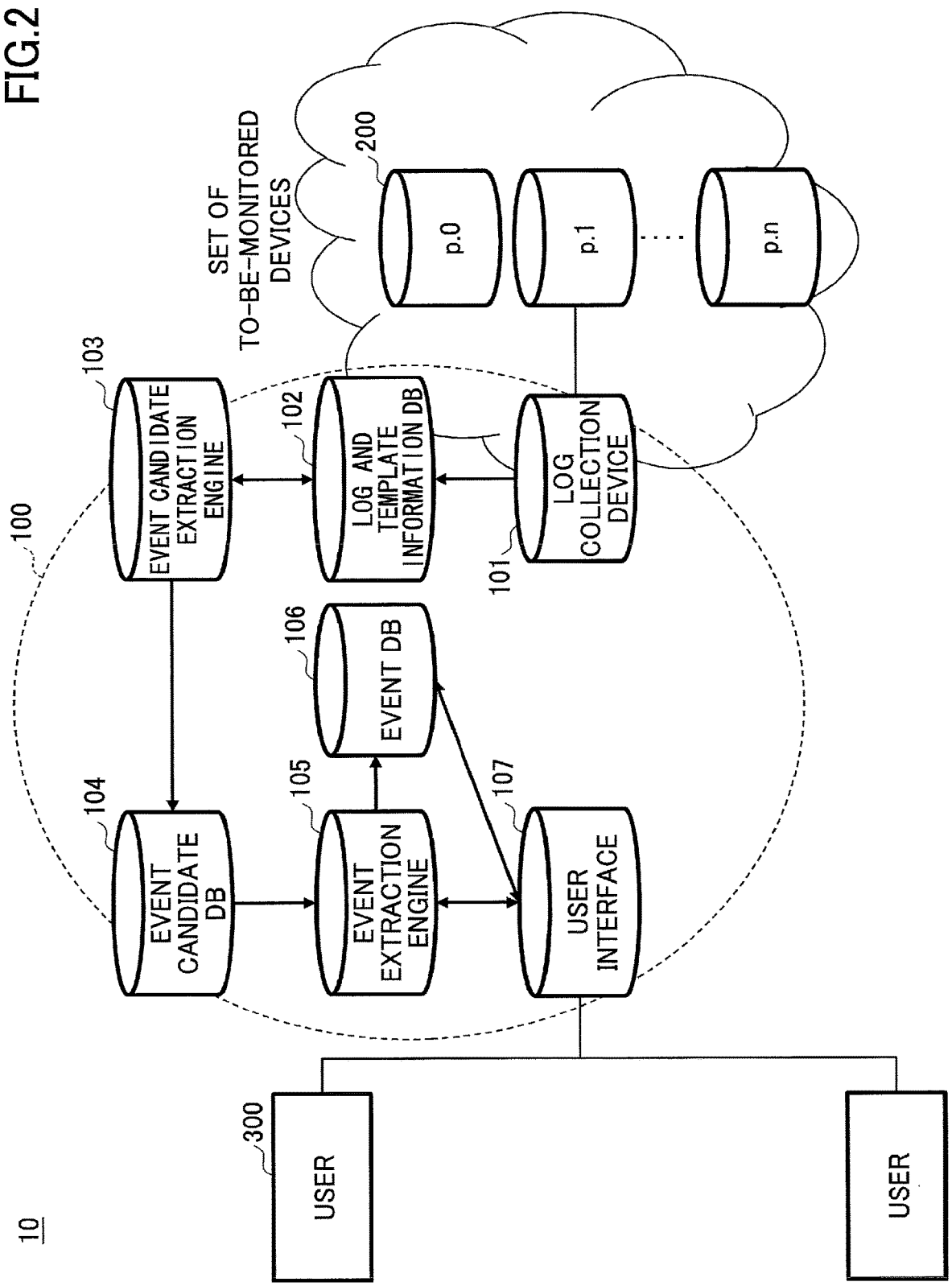
FIG. 2 is a schematic diagram for illustrating a log analysis system according to one embodiment of the present invention.

A log analysis system according to one embodiment of the present invention is described with reference to FIG. 2. FIG. 2 is a schematic diagram for illustrating a log analysis system according to one embodiment of the present invention.

As illustrated in FIG. 2, the log analysis system 10 has a log analysis apparatus 100, a set of to-be-monitored devices 200 and a user apparatus 300.

The log analysis apparatus 100 stores templates for log messages in advance, collects log messages from hosts of a set of to-be-monitored devices 200 and performs operations as described below on the collected log messages to extract correlated template sequences as events. As illustrated in FIG. 2, the log analysis apparatus 100 includes hardware components: a log collection apparatus 101, a log and template information database (DB) 102, an event candidate extraction engine 103, an event candidate database (DB) 104, an event extraction engine 105, an event database (DB) 106 and a user interface 107.

The log collection apparatus 101 is communicatively connected to the set of to-be-monitored devices 200 and collects log messages from the hosts (p.0, p.1, . . . , p.n) in the set of to-be-monitored devices 200. The log messages may be syslog, for example, but are not limited to syslog, and may be any other appropriate messages indicative of operating states or the like of the hosts transmitted from the hosts.

The log and template information DB 102 stores log messages collected by the log collection apparatus 101 as well as templates extracted from the log messages. In this embodiment, the stored templates may be ones extracted beforehand from previously collected log messages by using any appropriate template extraction method. For example, the template may have a data format where specific parameter values are set as wild cards "*" as illustrated in FIG. 1 and be composed of important portions and or rows in the log message. Note that an identifier (ID) is assigned to each template and the templates are represented as i=1, 2, . . . , I, for example.

The event candidate extraction engine 103 performs an event candidate extraction operation as described below to extract a sequence of one or more templates related to log messages sequentially collected from the same host as an event candidate.

The event candidate DB 104 stores event candidates extracted from the event candidate extraction engine 103.

The event extraction engine 105 performs an event extraction operation as described below to extract a sequence or pattern of frequently occurring templates from the extracted event candidates.

The event DB 106 stores events extracted from the event extraction engine 105.

The user interface 107 provides the extracted events to a user of the user apparatus 300. For example, the user interface 107 may transmit the extracted events to the user apparatus 300 such that the user apparatus 300 can display the events to the user.

As one exemplary hardware arrangement, the log analysis apparatus 100 has a drive device, an auxiliary storage device, a memory device, a CPU (Central Processing Unit) and an interface device, which are connected to each other via a bus. Various programs for implementing various functions and operations at the log analysis apparatus 100 as described below may be provided by a recording medium such as an optical disk or a semiconductor memory. When the recording medium storing the program is set to the drive device, the program is loaded into the auxiliary storage device from the recording medium via the drive device. However, the program is not necessarily installed from the recording medium and may be downloaded from any external device via a network (not shown). The auxiliary storage device stores the installed programs as well as necessary files, data or the like. The memory device reads and stores programs and/or data from the auxiliary storage device, if activation of the programs is instructed. The above-stated databases may be implemented in the auxiliary storage device and the memory device. The CPU is a processor for processing information and performs various functions and operations of the log analysis apparatus 100 as described below in accordance with programs and various data required to run the programs stored in the memory device. The above-stated engines may be implemented in the processor. The interface device is used as a communication interface for connecting to a network or an external device. However, the log analysis apparatus 100 is not limited to the above-stated hardware arrangement and may be implemented as any appropriate information processing device.

The set of to-be-monitored devices 200 includes one or more hosts p.0 to p.n and are communicatively connected to the log analysis apparatus 100 via a network. Each host may be a network device such as a router, for example, and sequentially generates various log messages such as syslog messages and transmits them to the log analysis apparatus 100. In one embodiment, the log message includes a time stamp indicative of generation time of the log message, a host name generating the log message and a message body. Note that an identifier (ID) is assigned to each host and the hosts are represented as h=1, 2, . . . , H, for example.

The user apparatus 300 is an information processing device such as a personal computer, a smartphone or a tablet and is communicatively connected to the log analysis apparatus 100 via a network. A user can determine events as analysis results from the log analysis apparatus 100 via the user apparatus 300.

Figure 3:
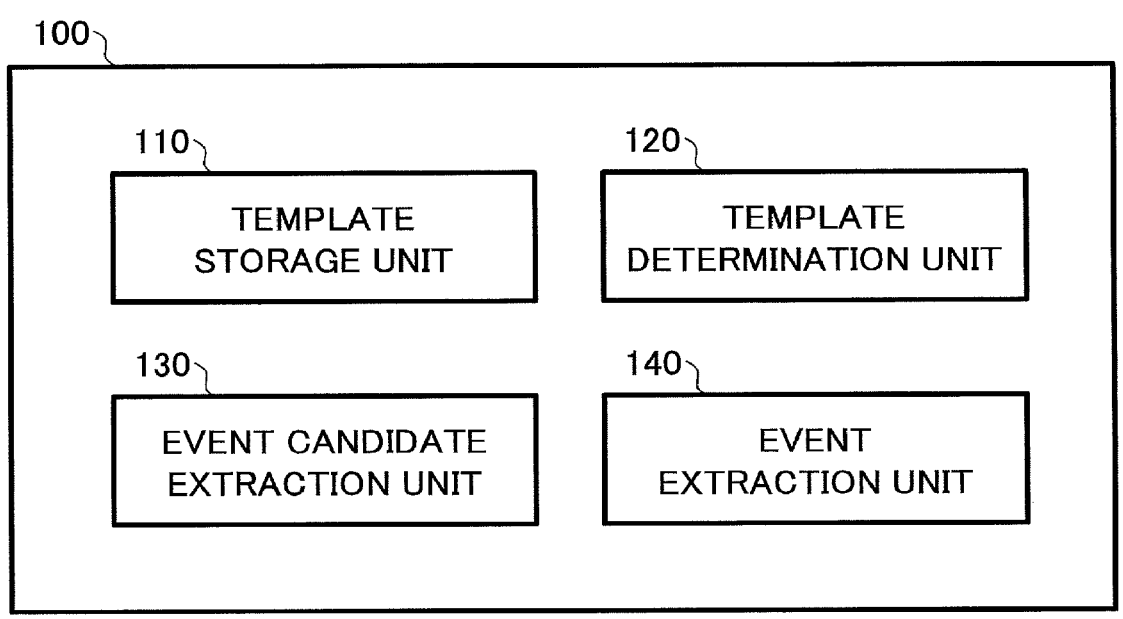
FIG. 3 is a block diagram for illustrating a functional arrangement of a log analysis apparatus according to one embodiment of the present invention.

Next, the log analysis apparatus according to one embodiment of the present invention is described with reference to FIGS. 3-6. FIG. 3 is a block diagram for illustrating a functional arrangement of the log analysis apparatus according to one embodiment of the present invention.

As illustrated in FIG. 3, the log analysis apparatus 100 has a template storage unit 110, a template determination unit 120, an event candidate extraction unit 130 and an event extraction unit 140.

The template storage unit 110 stores templates for log messages. Specifically, the log analysis apparatus 100 collects log messages from hosts h in the set of to-be-monitored devices 200 and stores templates extracted from the log messages collected by then in accordance with any appropriate template extraction method. In one embodiment, each template is composed of a log message useful for a user and may have a data format where specific parameter values are set as a wild card "*" in the log message as illustrated in FIG. 1. For example, the template may be automatically extracted in accordance with a template extraction method as disclosed in Patent Application No. 2013-168226 filed by this applicant or may be preconfigured by an operator of the log analysis apparatus 100. An identifier (ID) is assigned to each template, and the templates are represented as i=1, 2, . . . , I, for example.

The template determination unit 120 determines templates corresponding to log messages provided from the to-be-monitored devices from the stored templates. Specifically, each log message includes a time stamp indicative of generation time of the log message, a name of the host generating the log message and a message body.

The template determination unit 120 compares each row in log messages received from the hosts of the set of the to-be-monitored devices 200 with the templates stored in the template storage unit 110 to extract templates corresponding to the received log messages. For example, in the example for log messages and templates as illustrated in FIG. 1, the log messages match with the templates except that specific values such as "662288" are set to the wild cards "*". As a result, the template determination unit 120 can determine that the log messages match with the templates. The template determination unit 120 sequentially performs the comparison with the templates on each of the stored log messages to determine the log messages corresponding to the stored templates. Note that the template determination unit 120 may determine the templates corresponding to the log messages provided in online or offline as stated below and provide the determined templates to the event candidate extraction unit 130.

The event candidate extraction unit 130 detects templates determined for log messages provided from the same host from the determined templates and extracts a sequence of the detected templates as an event candidate. Specifically, for the templates determined by the template determination unit 120 to match with the log messages, the event candidate extraction unit 130 first detects templates determined for the log messages transmitted from the same host with reference to the host name of the generating host in the log messages.

In one embodiment, upon detecting the templates determined for the log messages provided from the same host, the event candidate extraction unit 130 may extract immediately previous templates of the detected templates from the templates determined for the log messages provided from the same host based on the time stamps of the log messages and determines whether the detected templates and the immediately previous templates belong to the same event candidates based on occurrence time differences between the detected templates and the immediately previous templates. In general, if the occurrence time differences are small, it can be estimated that these two templates may occur in correlation, and there is a high likelihood that they belong to the same event candidate.

Figure 4:
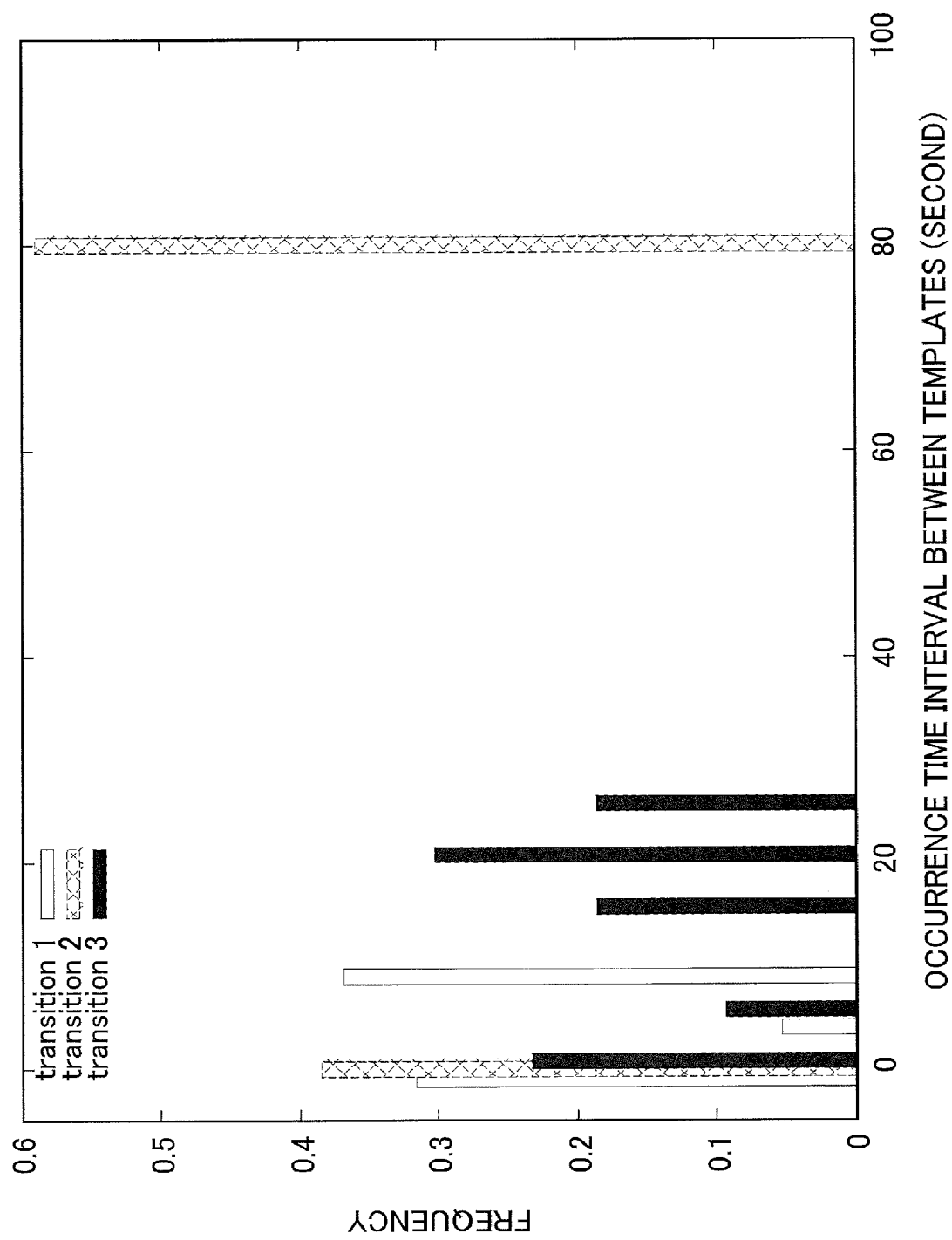
FIG. 4 is a diagram for illustrating a distribution of occurrence time intervals among templates.

For example, as illustrated in FIG. 4, it is known that occurrence time intervals between templates tend to be subject to multimodal distributions. In the illustrated example, the occurrence time intervals between templates based on previous data are shown, and a distribution of occurrence time intervals (seconds) between three pairs of templates is shown. As can be seen in the illustration, there are cases where the occurrence time intervals between templates are subject to the multimodal distribution, and it can be considered that different events can be distinguished based on different modalities in the distribution. A method for learning thresholds for modalities in the distribution of the occurrence time intervals between templates is described below. The method is based on an approach where the template occurrence time intervals are considered as clusters and the threshold of the occurrence time difference ($dur(t0, t)$ as described below) is sequentially updated or learned for each cluster.

Figure 5:
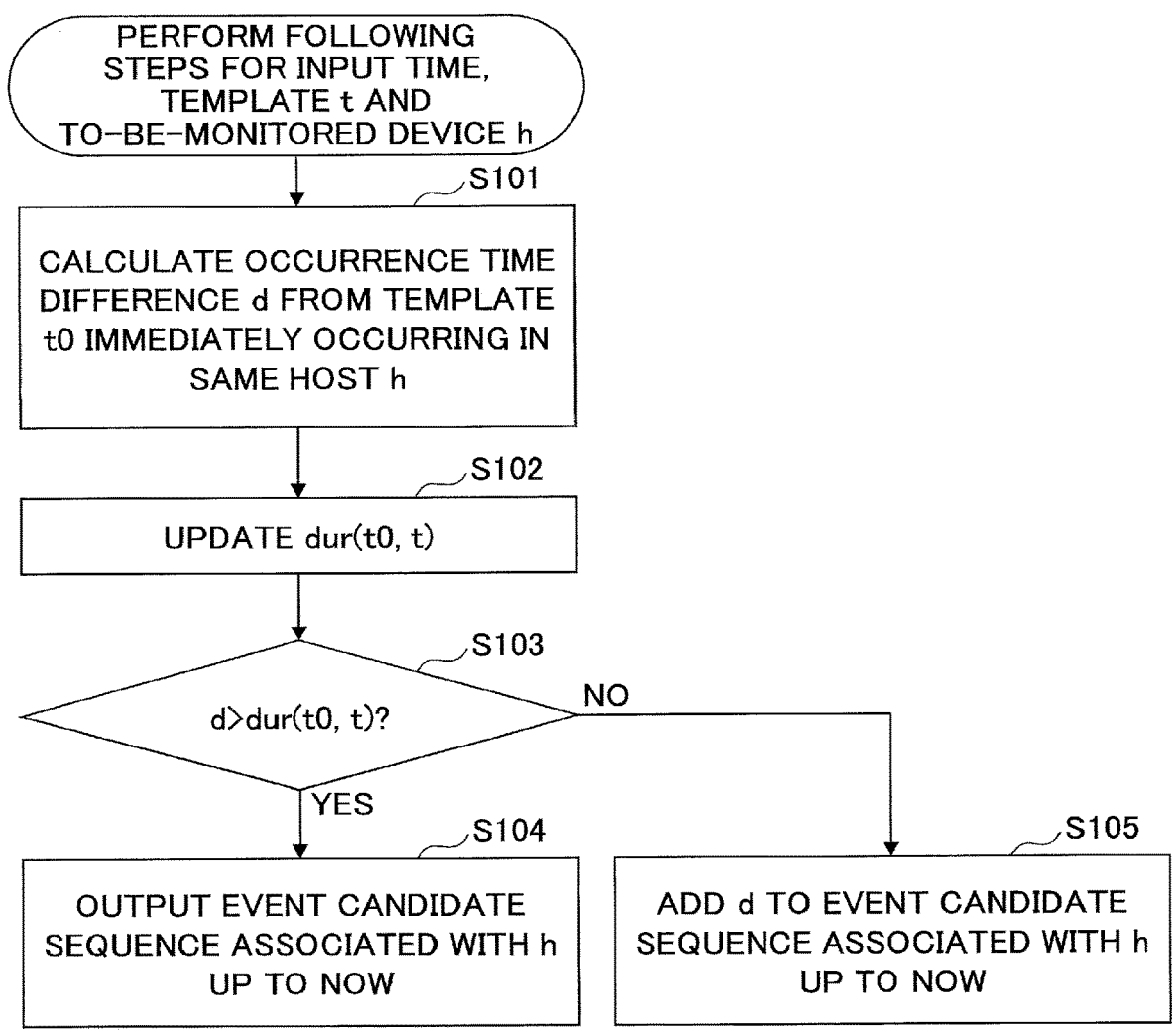
FIG. 5 is a flowchart for illustrating an event candidate extraction operation according to one embodiment of the present invention.

Then, the event candidate extraction operation is described in detail with reference to FIG. 5. FIG. 5 is a flowchart for illustrating an event candidate extraction operation according to one embodiment of the present invention.

As illustrated in FIG. 5, at step S101, for a template t determined for a host h, the event candidate extraction unit 130 calculates an occurrence time difference d between an occurrence time of a template t0 determined to match with an immediately previously occurring log message in the host h and the occurrence time of the template t.

At step S102, the event candidate extraction unit 130 updates the occurrence time interval $dur(t0, t)$ depending on the template t0 and the template t in accordance with an update operation as described below. As stated above, if the template t0 and the template t occur during a predefined time period, it can be estimated that the template t0 and the template t occur in correlation, and $dur(t0, t)$ is defined as that time period. The occurrence time interval $dur(t0, t)$ may be defined to different values depending on template types, event types or the like. Here, the occurrence time interval $dur(t0, t)$ depends on the templates t0 and t. This is because the occurrence time interval is different for each template and each event. However, values of the occurrence time interval $dur(t0, t)$ are not obvious in general and may be sequentially estimated in accordance with an update operation as described below.

At step S103, the event candidate extraction unit 130 determines whether the occurrence time difference d is greater than the occurrence time interval $dur(t0, t)$, that is, whether it can be estimated that the template t0 and the template t have occurred in correlation. If the occurrence time difference d is greater than the occurrence time interval $dur(t0, t)$ (S103: yes), the event candidate extraction unit 130 determines that the template t0 and the template t have not occurred in correlation and establishes a sequence of templates up to the template t0 as an event candidate. In other words, if the occurrence time difference d is greater than the occurrence time interval $dur(t0, t)$, the event candidate extraction unit 130 establishes templates t1, t2, . . . , which have occurred before the immediately previous template t0 determined for log messages provided from the same host h, as an event candidate and extracts the detected template t as a new event candidate.

On the other hand, if the occurrence time difference d is smaller than or equal to the occurrence time interval dur(t0, t) (S103: no), the event candidate extraction unit 130 determines that the template t0 and the template t have occurred in correlation and adds the template t to the template sequence up to the template t0. In other words, the event candidate extraction unit 130 estimates the occurrence time interval dur(t0, t) dependent on the detected template t and the immediately previous template t0 and determines that the detected template t and the immediately previous template t0 belong to the same event candidate t, t1, t2, . . . , if the occurrence time difference d is smaller than or equal to the occurrence time interval dur(t0, t).

Figure 6:
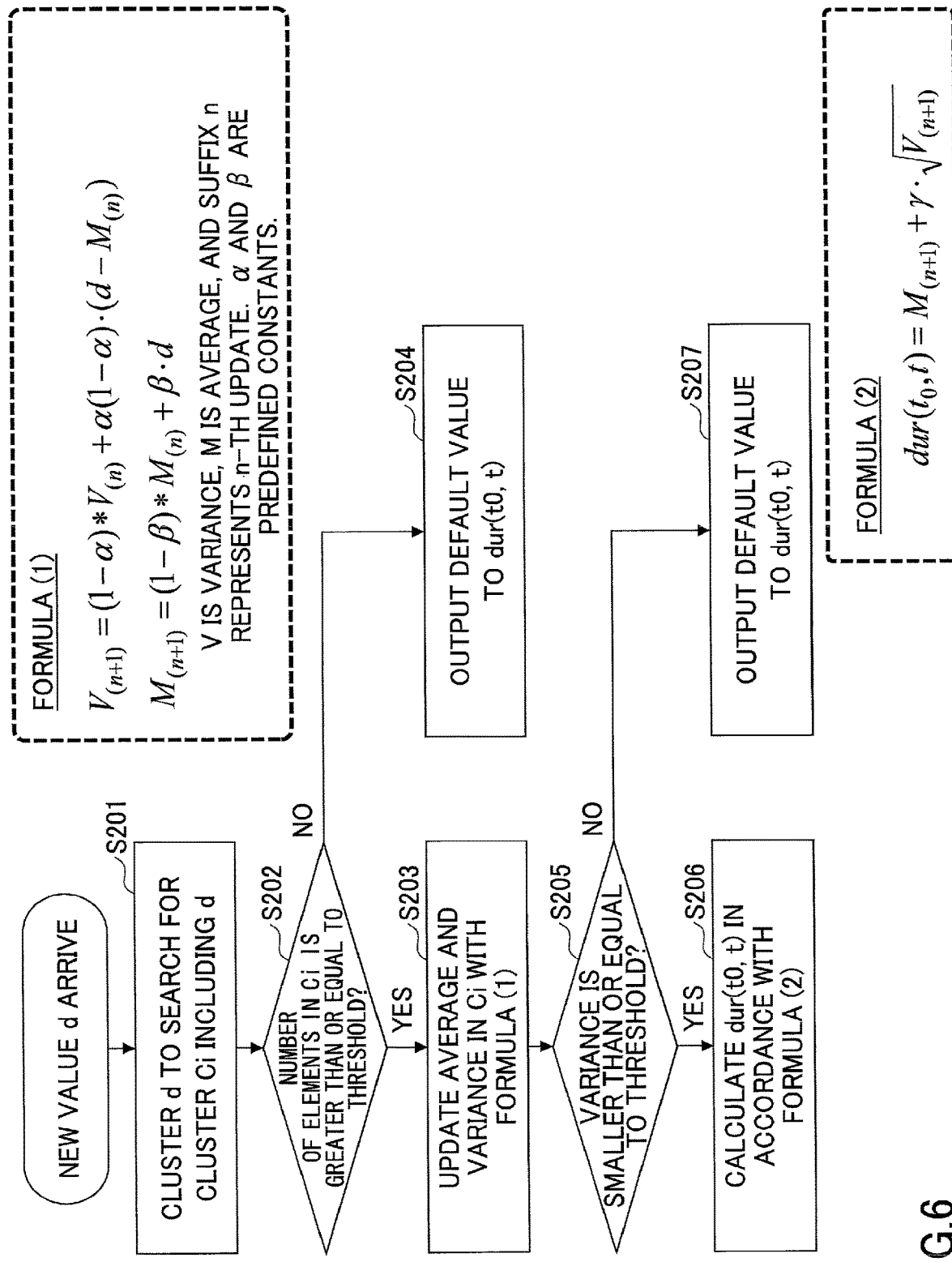
FIG. 6 is a flowchart for illustrating an update operation of dur(t0, t) according to one embodiment of the present invention.

Then, step S102 for the above-stated calculation of the occurrence time interval dur(t0, t) is described in detail with reference to FIG. 6. In one embodiment, the event candidate extraction unit 130 may determine a cluster to which the occurrence time difference d belongs from clusters generated for previously calculated occurrence time differences and estimate the occurrence time interval dur(t0, t) based on an average and a variance of the determined cluster. FIG. 6 is a flowchart for illustrating an update operation of dur(t0, t) according to one embodiment of the present invention.

As illustrated in FIG. 6, at step S201, the event candidate extraction unit 130 clusters the occurrence time difference d between the template t and the template t0 and searches for the cluster to which d belongs. Specifically, the event candidate extraction unit 130 calculates time intervals t-t0, t-t1, . . . , t-tp-1 for previous P templates (t0, t1, . . . , tp-1) before t at the host h and adds respective calculation results to the corresponding occurrence interval lists DL(t0, t), DL (t1, t), . . . , DL (tp-1, t). Then, the event candidate extraction unit 130 clusters the newly added occurrence time difference d for the respective DL(ti, t) (i=0, 1, . . . , p-1). This is because the occurrence interval of the same template does not necessarily have a unique value and is considered to have a certain range.

Here, an arbitrary sequentially executable clustering method can be applied to the clustering, but a DBSCAN based method as described in detail below may be employed.

At step S202, the event candidate extraction unit 130 determines whether the number of elements included in cluster Ci to which the occurrence time difference d belongs is greater than or equal to a predefined threshold. If the number of elements included in the cluster Ci is greater than or equal to the threshold (S202: yes), the event candidate extraction unit 130 proceeds to step S203. On the other hand, if the number of elements included in the cluster Ci is smaller than the threshold (S202: no), at step S204, the event candidate extraction unit 130 determines that the cluster Ci corresponds to an outlier and sets the occurrence time interval dur(t0, t) to a default value.

At step S203, the event candidate extraction unit 130 updates the average M and the variance V for the cluster Ci in accordance with formulae as follows.

$$M_{(n+1)} = (1-\beta) * M_{(n)} + \beta \cdot d$$

$$V_{(n+1)} = (1-\alpha) * V_{(n)} + \alpha(1-\alpha) \cdot (d - M_{(n)}),$$

where n represents the number of updates and α and β are predefined constants.

In other words, the post-updated average $M_{(n+1)}$ is calculated based on the pre-updated average $M_{(n)}$ and the occurrence time difference d for the cluster Ci, and the post-updated variance $V_{(n+1)}$ is calculated based on the pre-updated variance $V_{(n)}$, the occurrence time difference d and the pre-updated average $M_{(n)}$ for the cluster Ci.

At step S205, the event candidate extraction unit 130 determines whether the post-updated variance $V_{(n+1)}$ is smaller than or equal to a predefined threshold. If the variance $V_{(n+1)}$ is smaller than or equal to the threshold (S205: yes), the event candidate extraction unit 130 proceeds to step S206, and otherwise if the variance $V_{(n+1)}$ exceeds the threshold (S205: no), the event candidate extraction unit 130 determines that the template t and the template t0 have not occurred in correlation. At step S207, the event candidate extraction unit 130 determines that the cluster Ci corresponds to an outlier and sets the occurrence time interval d(t0, t) to a default value.

At step S206, the event candidate extraction unit 130 updates the occurrence time interval dur(t0, t) in accordance with a formula as follows, $$\mathrm{dur}(t_0, t) = M_{(n+1)} + \gamma \cdot \sqrt{V_{(n+1)}},$$

where γ is a predefined constant.

The event candidate extraction unit 130 uses the obtained occurrence time interval dur(t0, t) to perform the update operation of dur(t0, t) at step S102. According to the above-stated DBSCAN based clustering method, all the calculations can be performed sequentially, and the calculation speed cannot be significantly degraded. Note that the update operation of dur(t0, t) according to the present invention is not limited to it and any appropriate method capable of the sequential clustering may be applied.

Figure 7:
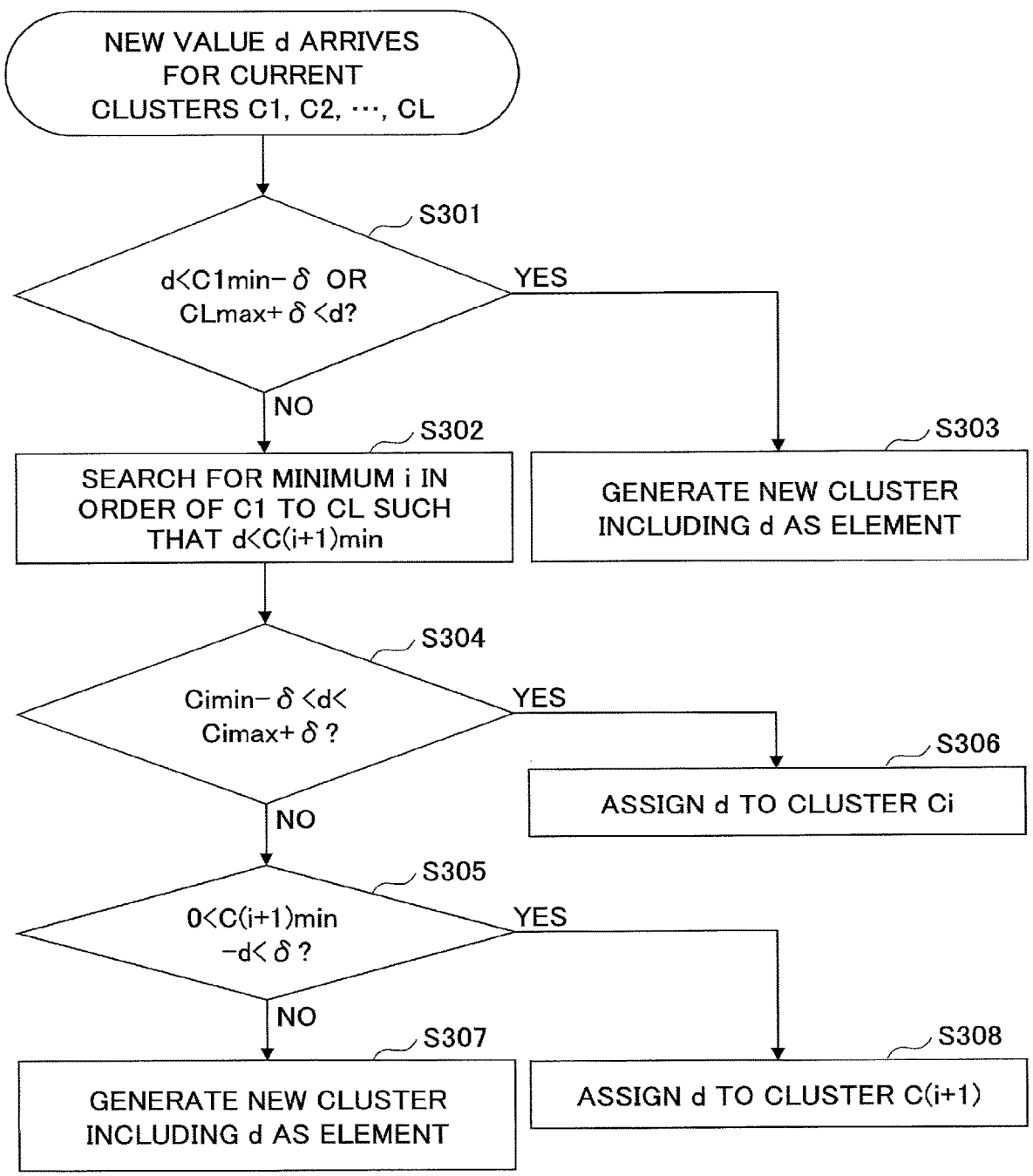
FIG. 7 is a flowchart for illustrating a clustering operation on occurrence time differences according to one embodiment of the present invention.

Then, step S201 for the above-stated clustering operation is described in detail with reference to FIG. 7. FIG. 7 is a flowchart for illustrating the clustering operation of the occurrence time difference according to one embodiment of the present invention.

As illustrated in FIG. 7, let clusters for occurrence intervals obtained up to the current timing be C1, . . . , CL. The Ci (i=1, 2, . . . , L) is sorted in ascending order, and the minimum and maximum values in values included in Ci are defined as Cimin and Cimax, respectively. Here, when a new occurrence time difference d arrives, at step S301, the event candidate extraction unit 130 determines whether the occurrence time difference d belongs to any previously occurring cluster Ci, that is, whether d<C1min−δ or CLmax+δ<d.

If d<C1min−δ or CLmax+δ<d does not hold (S301: no), the event candidate extraction unit 130 determines that the occurrence time difference d belongs to any previously occurring cluster Ci and proceeds to step S302. On the other hand, if d<C1min−δ or CLmax+δ<d holds (S301: yes), the event candidate extraction unit 130 determines that the occurrence time difference d does not belong to any previously occurring cluster Ci and generates a new cluster having the occurrence time difference d as an element.

At step S302, the event candidate extraction unit 130 searches for the minimum i such that d<C(i+1)min holds in ascending order from the cluster C1.

At step S304, the event candidate extraction unit 130 determines whether Cimin−δ<d<Cimax+δ. If Cimin−δ<d<Cimax+δ holds (S304: yes), at step S306, the event candidate extraction unit 130 assigns the occurrence time difference d to the cluster Ci. On the other hand, if Cimin−δ<d<Cimax+δ does not hold (S304: no), the event candidate extraction unit 130 determines that the occurrence time difference d does not belong to the cluster Ci and at step S305, determines whether the occurrence time difference d belongs to the cluster $C_{i+1}$, that is, whether $0<C(i+1)min-d<\delta$ holds.

If $0<C(i+1)min-d<\delta$ does not hold (S305: no), the event candidate extraction unit 130 determines that the occurrence time difference d does not belong to any of the clusters $C_i$ and $C_{i+1}$ and generates a new cluster having the occurrence time difference d as an element. On the other hand, if $0<C(i+1)min-d<\delta$ holds (S305: yes), the event candidate extraction unit 130 determines that the occurrence time difference d belongs to the cluster $C_{i+1}$ and at step S308, assigns the occurrence time difference d to the cluster $C_{i+1}$. In this manner, the event candidate extraction unit 130 determines the cluster $C_{i+1}$ to which the occurrence time difference d belongs.

After that, the event candidate extraction unit 130 concatenates a sequence of templates i determined for the same host h chronologically and outputs the sequence of generated templates i as an event candidate.

The event extraction unit 140 extracts a sequence of frequently occurring templates as an event from the extracted event candidates. Specifically, the vent extraction unit 140 obtains a set or pattern of frequently occurring templates from extracted respective event candidates commonly as an event. The event extraction unit 140 can use any appropriate counting manner of frequently occurring patterns such as manners of sequentially listing closed frequently occurring patterns as disclosed in Y. Chi, H. Wang, P. S. Yu, and R. R. Muntz, "Moment: Maintaining Closed Frequent Itemsets over a Stream Sliding Window", In proc. of ICDM. 2004 or N. Jiang, and L. Gruenwald, "CFI-Stream: Mining Closed Frequent Itemsets in Data Streams", In proc. of KDD, 2006. Here, the closed pattern represents the maximum set of patterns having the same number of occurrences. For example, in CFI-Stream, a tree referred to as a DIU Tree, which is similar to a Prefix Tree and where the closed frequently occurring patterns are listed, is stored therein, and this is updated to include event candidates newly arriving in a sequential manner. The updating mainly corresponds to checking as to whether a new event candidate is already included in the DIU Tree or whether a new closed pattern holds with the minimum scanning. Users can comprehend more than or equal to occurring E events with the DIU Tree sequentially.

Figure 8:
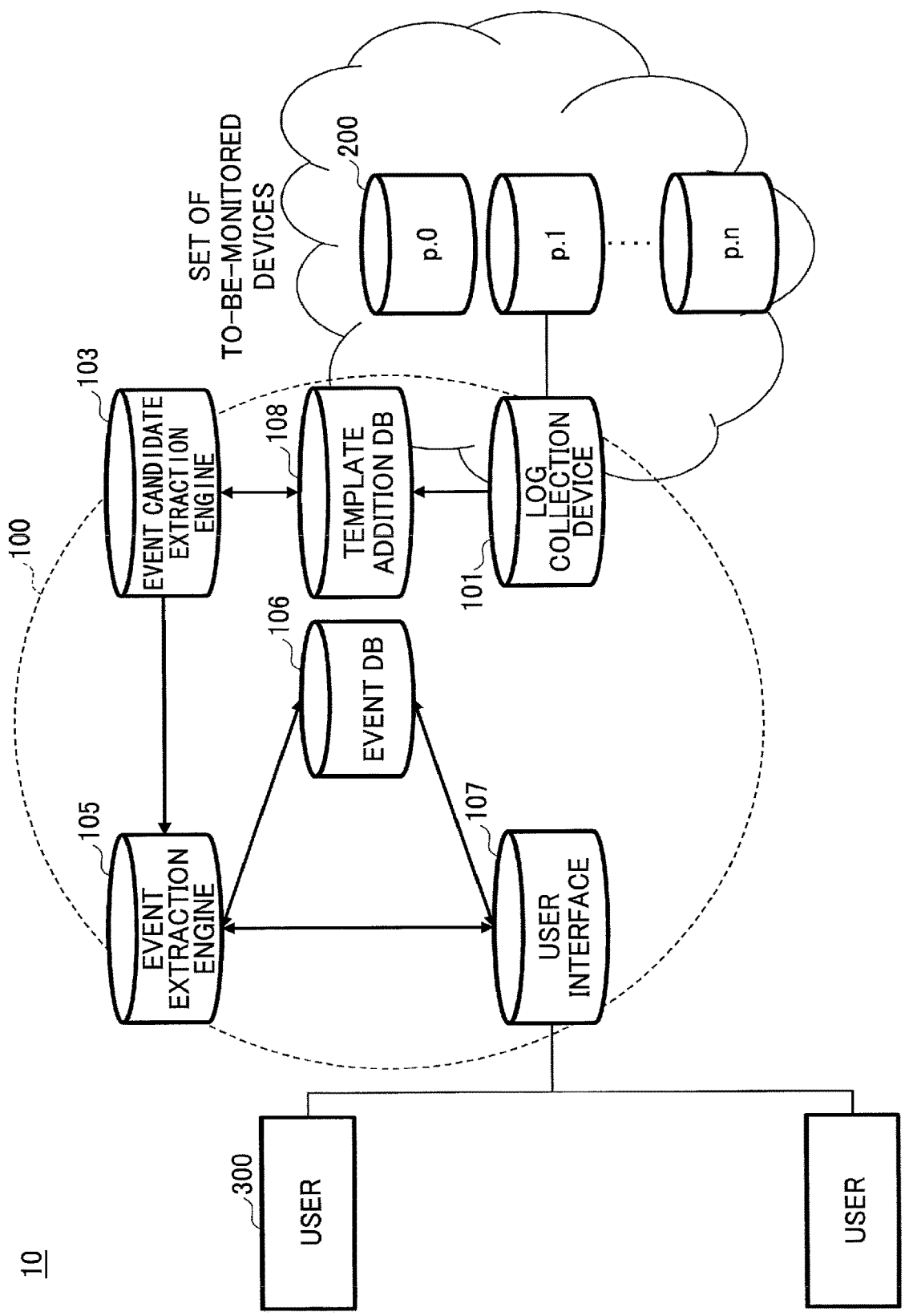
FIG. 8 is a schematic diagram for illustrating a log analysis system according to another embodiment of the present invention.

Next, a log analysis system according to another embodiment of the present invention is described with reference to FIGS. 8-10. The above-stated log analysis system 10 relates to an offline operation where the log analysis apparatus 100 collects log messages generated at the set of to-be-monitored devices 200 for a certain time period and performs the log analysis on the collected log messages for the time period. In other embodiments, the log analysis system 10 may relate to an online operation as illustrated in FIG. 8. In other words, whenever the log analysis apparatus 100 obtains a log message from a host, the log analysis apparatus 100 may extract an event for the obtained log message. Specifically, whenever the log analysis apparatus 100 obtains a log message from the set of to-be-monitored devices 200, the log analysis apparatus 100 stores the obtained log message in a template addition database (DB) 108. Furthermore, the log analysis apparatus 100 may perform the above-stated event candidate extraction operation on the respective stored log messages to extract an event candidate and extract an event from the extracted event candidates. The extracted event may be transmitted to the user apparatus 300 via the user interface 107, for example, whenever the event is extracted or in cases of issuance of a query from the user apparatus 300 or updating of a certain event.

Figure 9:
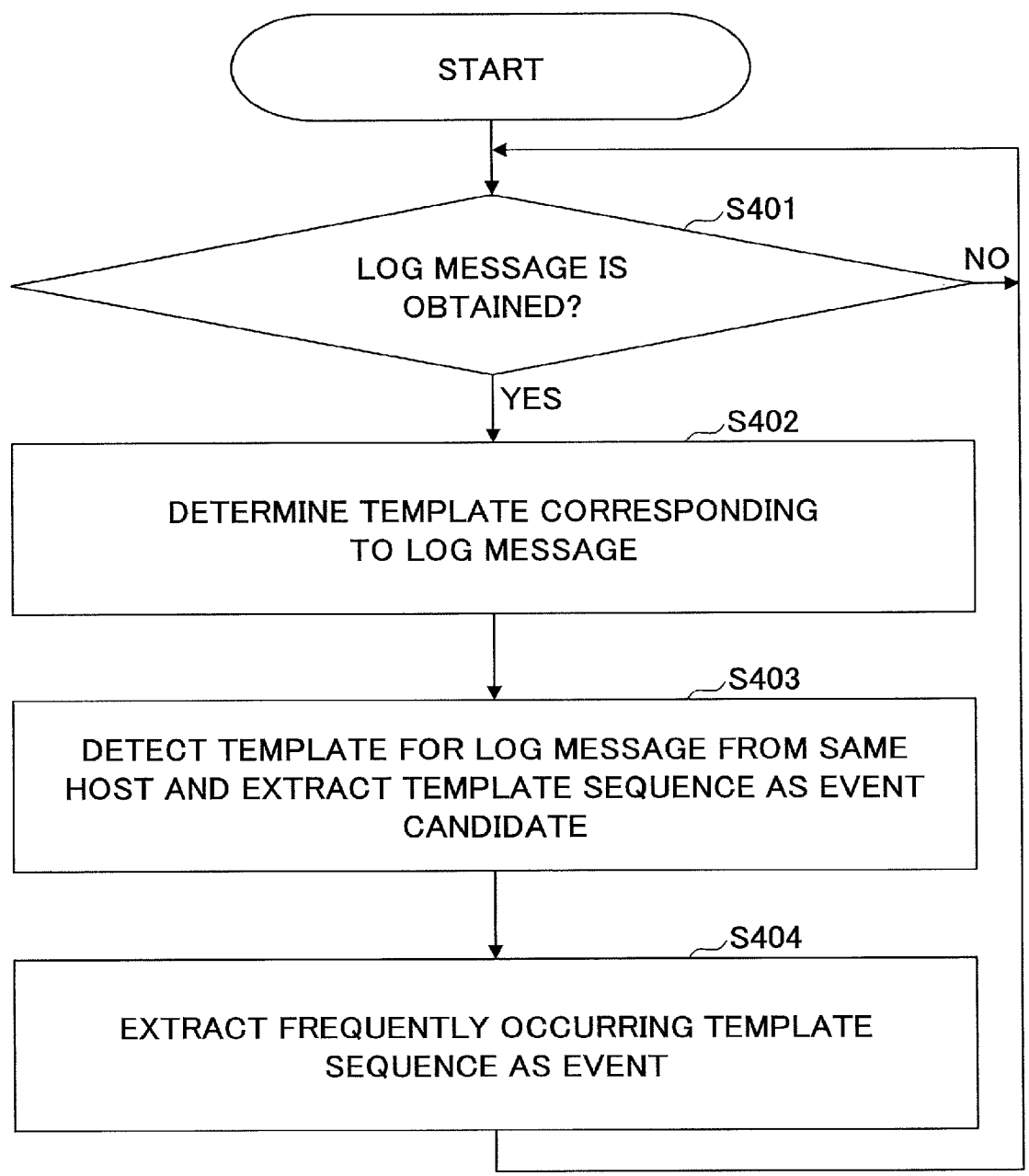
FIG. 9 is a flowchart for illustrating a log analysis operation according to another embodiment of the present invention.

FIG. 9 is a flowchart for illustrating a log analysis operation according to another embodiment of the present invention. The online log analysis operation corresponds to execution of the offline log analysis operation as described with reference to FIGS. 5-7 for each acquisition of log messages. The log analysis operation may be implemented by a computer running programs.

As illustrated in FIG. 9, at step S401, the log analysis apparatus 100 determines whether to obtain a log message from a host of the set of to-be-monitored devices 200 and upon obtaining the log message, performs subsequent steps. Here, after obtaining a predefined number (1, 2, 3, . . . ) of log messages from the host, the log analysis apparatus 100 may perform the subsequent steps. Alternatively, after obtaining the log messages from the host for a predefined time period, the log analysis apparatus 100 may perform the subsequent steps.

At step S402, the log analysis apparatus 100 determines templates corresponding to log messages provided from the to-be-monitored host from stored templates for log messages. Specifically, the log analysis apparatus 100 extracts templates corresponding to obtained log messages from the stored templates.

At step S403, the log analysis apparatus 100 detects templates determined for log messages provided from the same host from the determined templates and extracts a sequence of the detected templates as an event candidate. Specifically, the log analysis apparatus 100 performs the above-stated operations in conjunction with FIGS. 5-7 to extract event candidates and update and learn the occurrence time interval dur(t0, t).

At step S404, the log analysis apparatus 100 extracts a sequence of frequently occurring templates from the extracted event candidates as an event. Specifically, the log analysis apparatus 100 uses any existing manner as stated above to obtain a set or pattern of frequently occurring templates from respective extracted event candidates commonly as an event. After that, the operation returns to step S401, and the above-stated steps are performed for each acquisition of a log message.

Figure 10:
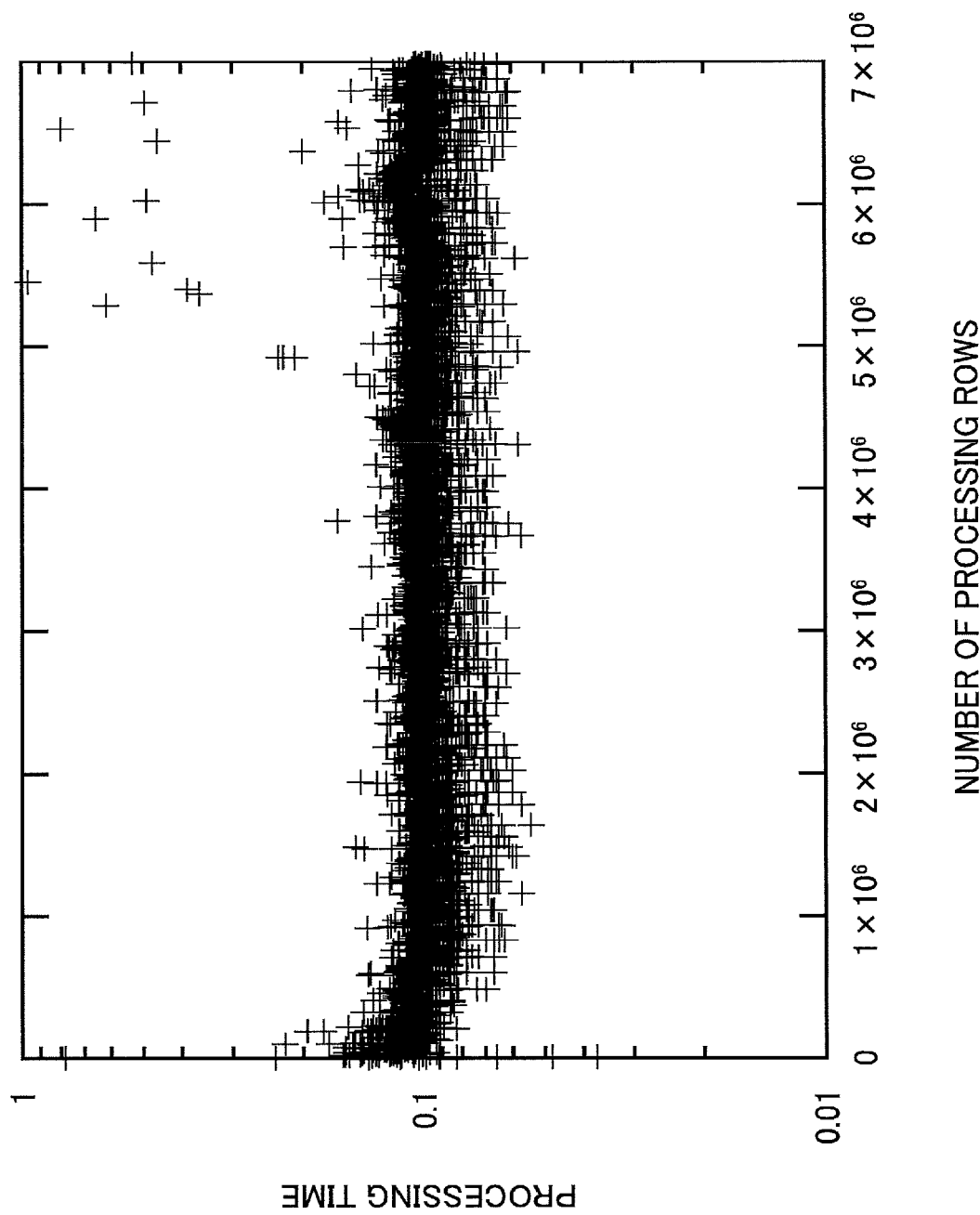
FIG. 10 is a diagram for illustrating a simulation result of a log analysis operation according to another embodiment of the present invention.

FIG. 10 is a diagram for illustrating simulation results of a log analysis operation according to another embodiment of the present invention. In the illustration, the simulation results obtained by applying the above-stated online log analysis operation are shown, and transition of processing time for each processing of 10,000 rows of log messages is shown. In the offline log analysis operation, the above-stated log analysis operation is performed for each acquisition of the log messages, which increases the number of processed rows and the processing time. On the other hand, according to the online log analysis operation according to this embodiment, the sequential operation can be achieved with a stable speed, as illustrated.

Figure 11:
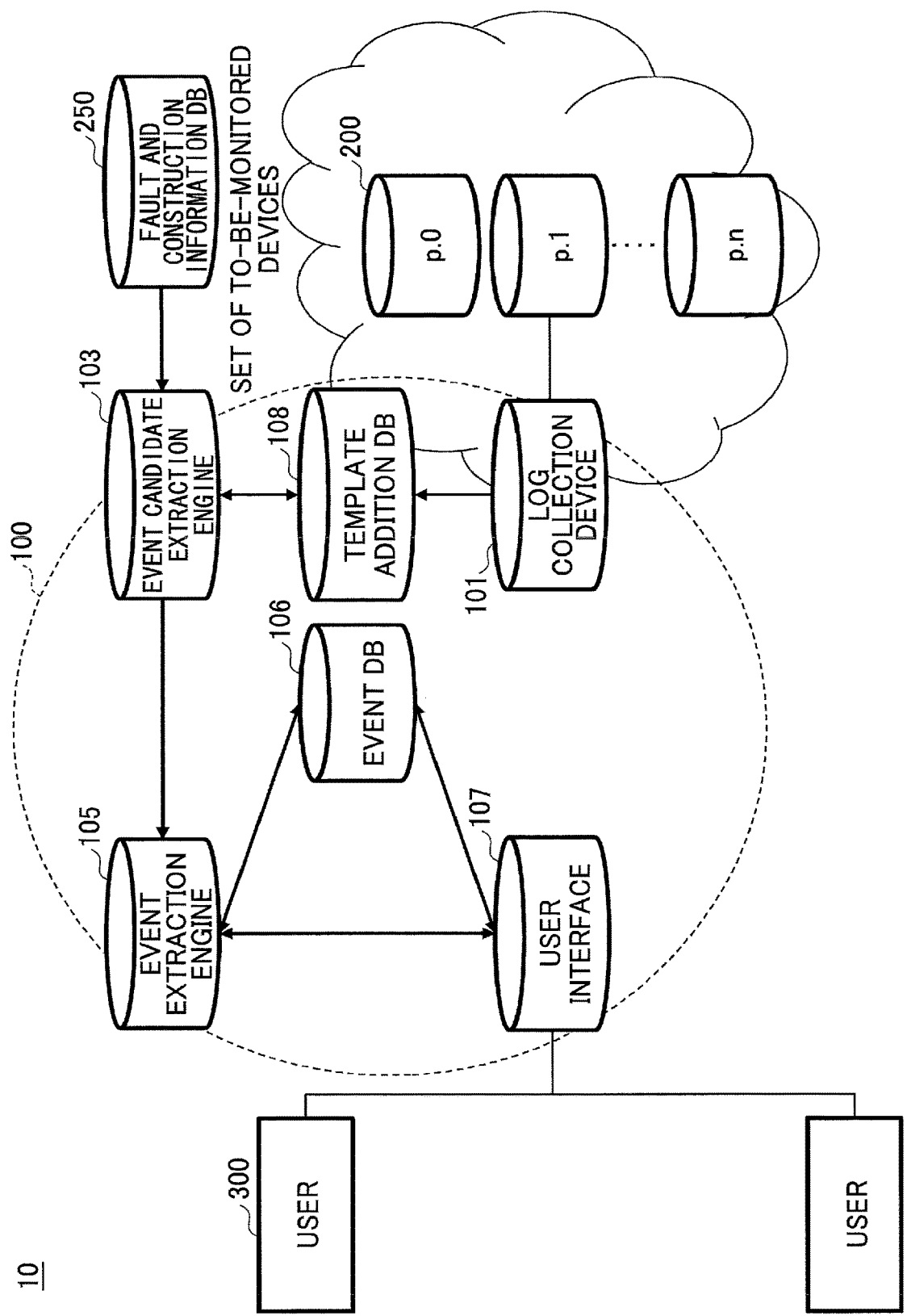
FIG. 11 is a schematic diagram for illustrating a log analysis system according to another embodiment of the present invention.

Also, in another embodiment, as illustrated in FIG. 11, the log analysis apparatus 100 is communicatively connected to a failure and construction information database (DB) 250 and may extract an event for log messages occurring at failure of network devices and/or log messages related to construction.

Although the embodiments of the present invention have been described in detail, the present invention is not limited to the above-stated specific embodiments, and various modifications and variations can be made within the spirit of the present invention as recited in claims.

This international patent application claims the benefit of priority based on Japanese Priority Application No. 2014-170097 filed on Aug. 25, 2014, the entire contents of which are hereby incorporated by reference.

LIST OF REFERENCE SYMBOLS

10: log analysis system
100: log analysis apparatus
110: template storage unit
120: template determination unit
130: event candidate extraction unit
140: event extraction unit
200: set of to-be-monitored devices
300: user apparatus

The invention claimed is:

1. A log analysis apparatus comprising:
a memory configured to store templates for log messages; and
processing circuitry configured to
    determine templates corresponding to log messages provided from a to-be-monitored host, among a plurality of to-be-monitored hosts that are connected to the log analysis apparatus, from the stored templates;
    detect templates determined for log messages provided from the same host from the determined templates and extract a sequence of the detected templates as an event candidate; and
    extract a sequence of templates representing a maximum set of patterns having a same number of occurrences as an event from the extracted event candidate,
    wherein upon detecting templates determined for log messages provided from the same host among the plurality of to-be-monitored hosts, the processing circuitry extracts an immediately previous template of the detected template from the templates determined for log messages provided from the same host based on time stamps of the log messages and determines whether the detected template and the immediately previous template belong to the same event candidate based on an occurrence time difference between the detected template and the immediately previous template.

2. The log analysis apparatus as claimed in claim 1, wherein whenever the log analysis apparatus obtains a log message from the host, the log analysis apparatus extracts the event from the obtained log message.

3. The log analysis apparatus as claimed in claim 1, wherein the processing circuitry estimates an occurrence time interval depending on the detected template and the immediately previous template.

4. The log analysis apparatus as claimed in claim 3, wherein if the occurrence time difference is smaller than or equal to the estimated occurrence time interval, the processing circuitry determines that the detected template and the immediately previous template belong to the same event candidate.

5. The log analysis apparatus as claimed in claim 3, wherein if the occurrence time difference is greater than the estimated occurrence time interval, the processing circuitry determines templates occurring up to the immediately previous template determined for log messages provided from the same host as an event candidate and extracts the detected template as a new event candidate.

6. The log analysis apparatus as claimed in claim 3, wherein the processing circuitry determines a cluster to which the occurrence time difference belongs from clusters generated for previously calculated occurrence time differences and estimates the occurrence time interval based on an average and a variance of the determined cluster.

7. The log analysis apparatus as claimed in claim 1, wherein the processing circuitry determines templates matching with log messages provided in offline or online.

8. A log analysis system comprising:
a log analysis apparatus;
a plurality of to-be-monitored hosts that are connected to the log analysis apparatus; and
a user apparatus configured to receive an event from the log analysis apparatus,
wherein the log analysis apparatus includes
    processing circuitry configured to
        store templates for log messages;
        determine templates corresponding to log messages provided from a to-be-monitored host, among the plurality of to-be-monitored hosts, from the stored templates;
        detect templates identified for log messages provided from the same host from the determined templates and extract a sequence of the detected templates as an event candidate; and
        extract a sequence of templates representing a maximum set of patterns having a same number of occurrences as an event from the extracted event candidate,
    wherein upon detecting templates determined for log messages provided from the same host among the plurality of to-be-monitored hosts, the processing circuitry extracts an immediately previous template of the detected template from the templates determined for log messages provided from the same host based on time stamps of the log messages and determines whether the detected template and the immediately previous template belong to the same event candidate based on an occurrence time difference between the detected template and the immediately previous template.

9. A log analysis method implemented with a log analysis apparatus, comprising:
determining templates corresponding to log messages provided from a to-be-monitored host, among a plurality of to-be-monitored hosts that are connected to the log analysis apparatus, from templates stored for log messages;
detecting templates determined for log messages provided from the same host from the determined templates and extracting a sequence of the detected templates as an event candidate; and
extracting a sequence of templates representing a maximum set of patterns having a same number of occurrences as an event from the extracted event candidate,
wherein upon detecting templates determined for log messages provided from the same host among the plurality of to-be-monitored hosts, the method includes extracting an immediately previous template of the detected template from the templates determined for log messages provided from the same host based on time stamps of the log messages and determining whether the detected template and the immediately previous template belong to the same event candidate based on an occurrence time difference between the detected template and the immediately previous template.

10. A non-transitory computer readable medium including a computer program for causing a computer to perform:
determining templates corresponding to log messages provided from a to-be-monitored host, among a plurality of to-be-monitored hosts that are connected to the log analysis apparatus, from templates stored for log messages;
detecting templates determined for log messages provided from the same host from the determined templates and extracting a sequence of the detected templates as an event candidate; and
extracting a sequence of templates representing a maximum set of patterns having a same number of occurrences as an event from the extracted event candidate,
wherein upon detecting templates determined for log messages provided from the same host among the plurality of to-be-monitored hosts, the method includes extracting an immediately previous template of the detected template from the templates determined for log messages provided from the same host based on time stamps of the log messages and determining whether the detected template and the immediately previous template belong to the same event candidate based on an occurrence time difference between the detected template and the immediately previous template.

* * * * *